US010429492B2

(12) United States Patent
Baba (10) Patent No.: US 10,429,492 B2
(45) Date of Patent: Oct. 1, 2019

(54) APPARATUS FOR CALCULATING MISALIGNMENT QUANTITY OF BEAM SENSOR (71) Applicant: DENSO CORPORATION, Kariya, Aichi-pref. (JP)

(72) Inventor: Takahiro Baba, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/513,534

(22) PCT Filed: Sep. 24, 2015

(86) PCT No.: PCT/JP2015/076931
§ 371 (c)(1),
(2) Date: Mar. 22, 2017

(87) PCT Pub. No.: WO2016/047689
PCT Pub. Date: Mar. 31, 2016

(65) Prior Publication Data
US 2017/0307730 A1    Oct. 26, 2017

(30) Foreign Application Priority Data
Sep. 24, 2014    (JP) ................. 2014-193888

(51) Int. Cl.
*G01S 7/40*    (2006.01)
*B60R 21/00*    (2006.01)
(Continued)

(52) U.S. Cl.
CPC ................ *G01S 7/40* (2013.01); *B60R 21/00* (2013.01); *G01S 7/4026* (2013.01); *G01S 13/42* (2013.01);
(Continued)

(58) Field of Classification Search
None
See application file for complete search history.

(56) References Cited

U.S. PATENT DOCUMENTS 6,412,183 B1* 7/2002 Uno .................... G01B 11/2755
33/203.12
9,798,002 B2* 10/2017 Baba ....................... G01S 13/50
(Continued)

FOREIGN PATENT DOCUMENTS

JP    H09-218265    8/1997
JP    H11-044756    2/1999
(Continued)

OTHER PUBLICATIONS

Elisabeth Agren, Lateral Position Detection Using a Vehicle-Mounted Camera, Linkoping 2003, pp. i-68.*
(Continued)

Primary Examiner — Tung S Lau
(74) Attorney, Agent, or Firm — Knobbe, Martens, Olson & Bear, LLP (57) ABSTRACT The misalignment quantity calculating apparatus determines whether a first object detected by a beam sensor is identical to a second object detected by an image sensor. Upon determining that the first object is identical to the second object, the misalignment quantity calculating apparatus calculates, as a misalignment quantity of the beam sensor, an angle between a first line segment and a second line segment; the first line segment connects a predetermined reference point of the misalignment quantity calculating apparatus and a first feature point of the first object, and the second line segment connects the predetermined reference point and a second feature point of the second object.

11 Claims, 5 Drawing Sheets (51) Int. Cl.
*G01S 13/86* (2006.01)
*G01S 13/93* (2006.01)
*G01S 13/42* (2006.01)
*G06K 9/00* (2006.01)
*G08G 1/16* (2006.01)
*B60W 30/09* (2012.01)
*G01S 7/497* (2006.01)

(52) U.S. Cl.
CPC .......... *G01S 13/867* (2013.01); *G01S 13/931* (2013.01); *G06K 9/00791* (2013.01); *G08G 1/166* (2013.01); *B60W 30/09* (2013.01); *B60W 2420/42* (2013.01); *B60W 2420/52* (2013.01); *B60W 2710/06* (2013.01); *B60W 2710/18* (2013.01); *G01S 7/4972* (2013.01); *G01S 13/86* (2013.01); *G01S 2007/403* (2013.01); *G01S 2007/4091* (2013.01); *G01S 2013/9325* (2013.01); *G01S 2013/9353* (2013.01)

(56) References Cited

U.S. PATENT DOCUMENTS

| | | | | |
|---|---|---|---|---|
| 9,811,745 | B2* | 11/2017 | Nakamura | G06K 9/00805 |
| 2002/0087253 | A1* | 7/2002 | Jeon | G06K 9/00798 |
| | | | | 701/93 |
| 2003/0007074 | A1* | 1/2003 | Nagaoka | H04N 7/18 |
| | | | | 348/148 |
| 2006/0290920 | A1* | 12/2006 | Kampchen | G01S 7/4972 |
| | | | | 356/139.04 |
| 2010/0329431 | A1* | 12/2010 | Augais | A61B 6/145 |
| | | | | 378/189 |
| 2011/0299734 | A1* | 12/2011 | Bodenmueller | G06K 9/00993 |
| | | | | 382/103 |
| 2012/0249399 | A1* | 10/2012 | Sato | G06T 7/13 |
| | | | | 345/4 |
| 2016/0114811 | A1* | 4/2016 | Matsuno | B60W 50/0225 |
| | | | | 701/23 |
| 2017/0217395 | A1* | 8/2017 | Baba | B60R 21/0134 |

FOREIGN PATENT DOCUMENTS

| | | |
|---|---|---|
| JP | 2004-198159 | 7/2004 |
| JP | 2006-011570 | 1/2006 |
| JP | 2006-292475 | 10/2006 |
| JP | 2006-292475 A | 10/2006 |
| JP | 2007-163258 | 6/2007 |
| JP | 2007-163258 A | 6/2007 |
| JP | 2008-215912 | 9/2008 |
| JP | 2008-215912 A | 9/2008 |
| JP | 2010-249613 | 11/2010 |
| JP | 2010-249613 A | 11/2010 |

OTHER PUBLICATIONS

Nobukazu Shima, Fusion Sensor for Driving Assistance System, 2001, p. 35-44.*

Shiho Tanaka, Vehicle Detection Based on Perspective Transformation Using Rear-View Camera, 2011, 10 pages.*

* cited by examiner

APPARATUS FOR CALCULATING MISALIGNMENT QUANTITY OF BEAM SENSOR

TECHNICAL FIELD

The present invention relates to a misalignment quantity calculating apparatus for calculating the misalignment quantity of a beam sensor.

BACKGROUND ART

A known system in a vehicle uses the combination of an image sensor and a millimeter radar as an example of beam sensors, which are for outputting probing beams, such as electromagnetic-wave beams or light-wave beams, to detect objects that are obstacles for travelling of the vehicle (see patent document 1 as an example).

CITATION LIST

Patent Document

[Patent Document 1] Japanese Patent Application Publication No. 2006-292475

SUMMARY OF INVENTION

Technical Problem

Unfortunately, an actual millimeter-beam axis of the millimeter radar of the above system may be misaligned with respect to a previously designed reference axis of millimeter beams of the millimeter radar in a horizontal direction and/or a vertical direction. This may result in the system having the lower accuracy of detecting objects.

In view of such a problem, an object of the present invention is to provide apparatuses for calculating the misalignment quantity of a beam sensor, such as a millimeter radar, with higher accuracy.

Means for Solving Problem

One aspect of the present invention includes a misalignment quantity calculating apparatus for calculating a misalignment quantity of a beam sensor. The misalignment quantity calculating apparatus includes an identity determining unit for determining whether a first object detected by the beam sensor is identical to a second object detected by an image sensor. The beam sensor transmits a probing beam and receives an echo based on the probing beam to thereby detect the first object. The image sensor captures an image and processes the image to thereby detect the second object. The misalignment quantity calculating apparatus includes a misalignment quantity calculating unit for calculating, as a misalignment quantity of the beam sensor, an angle between a first line segment and a second line segment when it is determined that the first object is identical to the second object. The first line segment connects a predetermined reference point of the misalignment quantity calculating apparatus and a first feature point of the first object, and the second line segment connects the predetermined reference point and a second feature point of the second object.

The misalignment quantity calculating apparatus set forth above calculates the angle formed between the first line segment and the second line segment as the misalignment quantity. This therefore enables the misalignment quantity of the beam sensor to be calculated, i.e. estimated, with higher accuracy.

Note that descriptions in the respective claims can be freely combined with one another wherever possible. In each of the combinations, a portion of the corresponding structure can be eliminated within the scope of achieving the object of the present invention.

DESCRIPTION OF EMBODIMENT

The following describes an exemplary embodiment of the present invention with reference to the accompanying drawings.

Structure of the Exemplary Embodiment

Figure 3A:
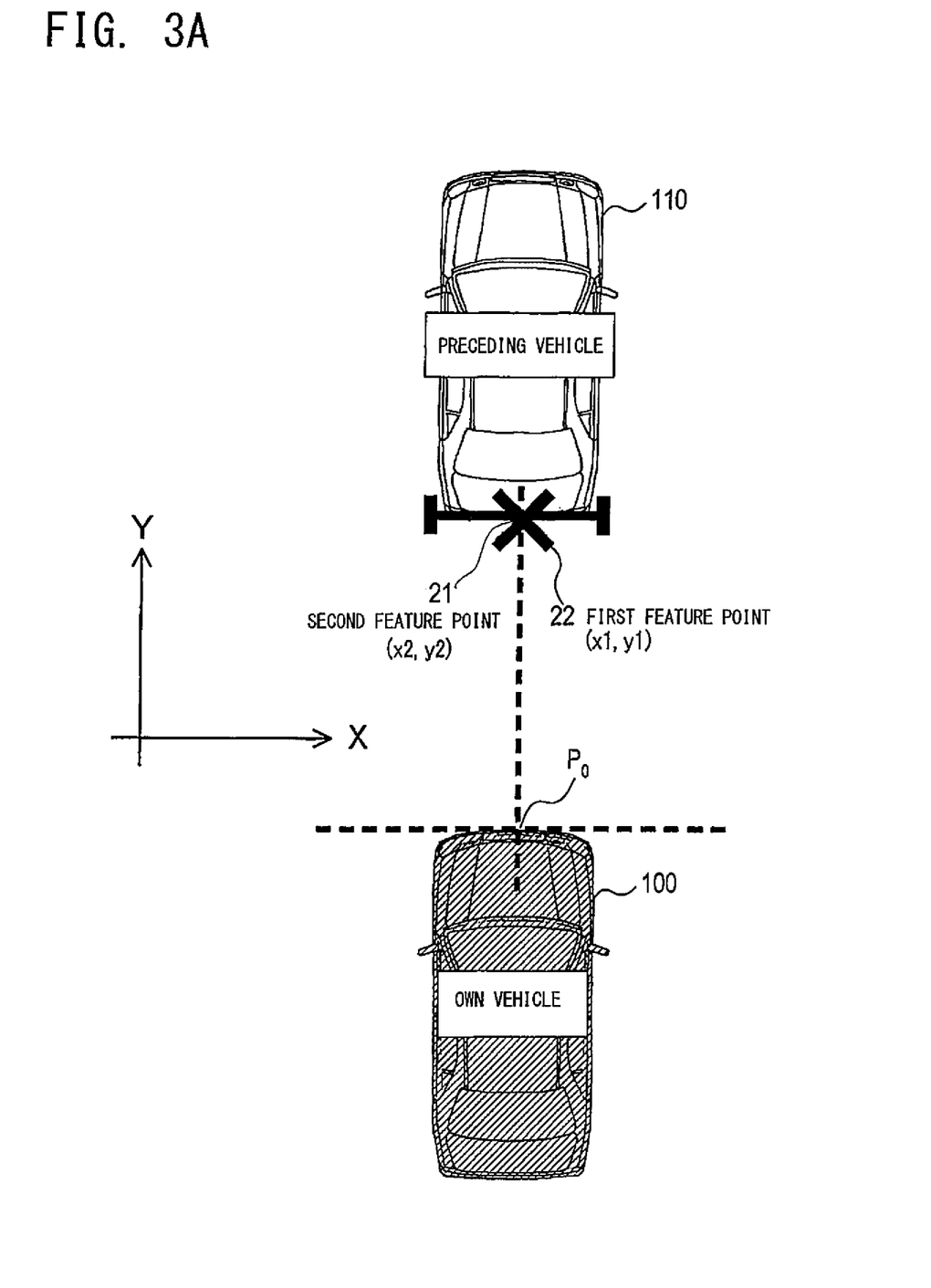
FIG. 3A is a plan view illustrating a positional relationship between an image-based target and a radar-based target upon a millimeter having no axial misalignment.
Figure 3B:
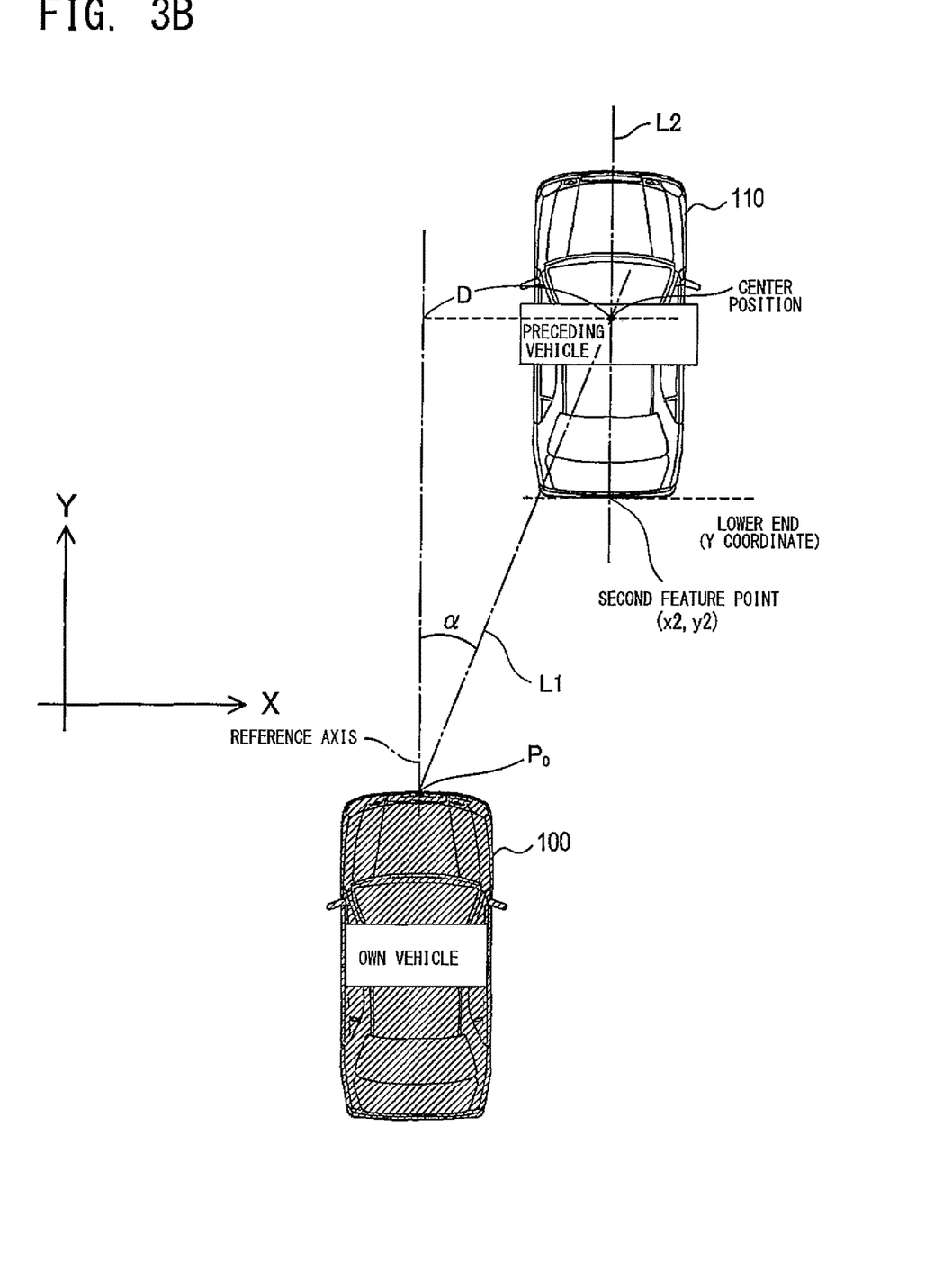
FIG. 3B is a view illustrating how to obtain positional coordinates of a second feature point of an image-based target.
Figure 4:
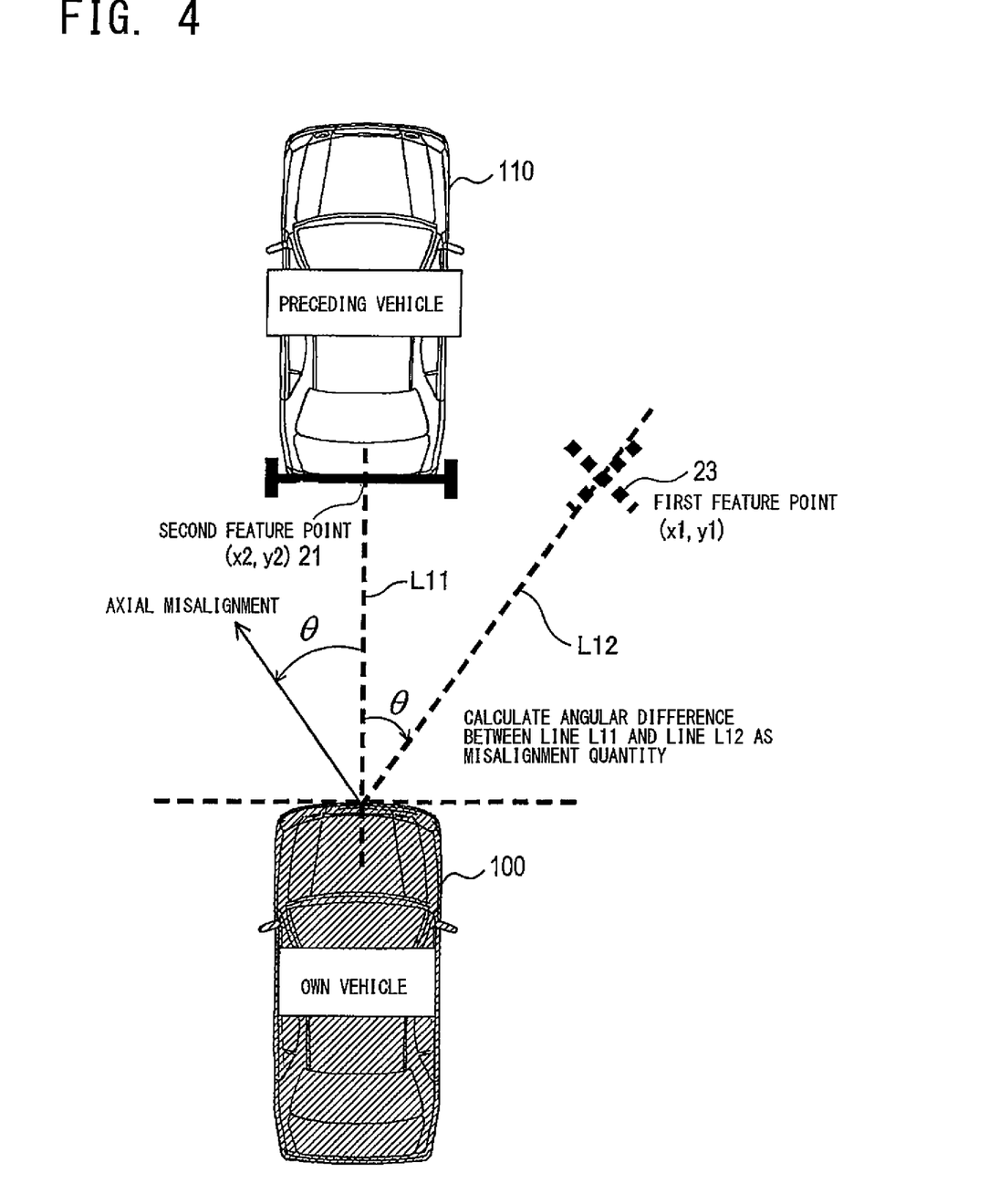
FIG. 4 is a plan view illustrating a positional relationship between an image-based target and a radar-based target upon a millimeter radar having axial misalignment.

A collision mitigating apparatus 1, to which the exemplary embodiment of the present invention is applied, is a system installed in a vehicle, such as a passenger vehicle, 100 (see FIG. 3A, FIG. 3B, or FIG. 4). The collision mitigating apparatus 1 detects targets or target objects, such as other vehicles or pedestrians, using a beam sensor and an imaging device. Then, the collision mitigating apparatus 1 determines whether there is a possibility of collision with the detected object. The collision mitigating apparatus 1 performs control of the own vehicle 1, such as braking of the own vehicle 1, to avoid collision or mitigate collision impacts.

In particular, the collision mitigating apparatus 1 according to the exemplary embodiment includes a function of correcting misalignment of a beam sensor.

The following describes axial misalignment of a beam sensor.

Axial misalignment of a beam sensor is that the actual center axis of a probing beam from a beam sensor is misaligned with respect to a previously designed reference axis in a horizontal direction and/or a vertical direction. In other words, the axial misalignment of a beam sensor means that the actual center axis of a probing beam from a beam sensor has a horizontally and/or vertically deviation angle with respect to a previously designed reference axis.

When the beam sensor is mounted to the center of the front of the vehicle 100, the reference axis of the beam sensor is designed such that the reference axis is parallel to a road surface on which the own vehicle 100 is travelling, and the reference axis is oriented to the front direction that is the forward direction of a line passing through the respective centers of the front and rear surfaces of the vehicle 100.

For example, the center axis of the probing beams transmitted from the beam sensor is in alignment with the reference axis if no axial misalignment has occurred. Otherwise, axial misalignment has occurred if the center axis of the probing beams transmitted from the beam sensor is horizontally and/or vertically misaligned with the reference axis.

Figure 1:
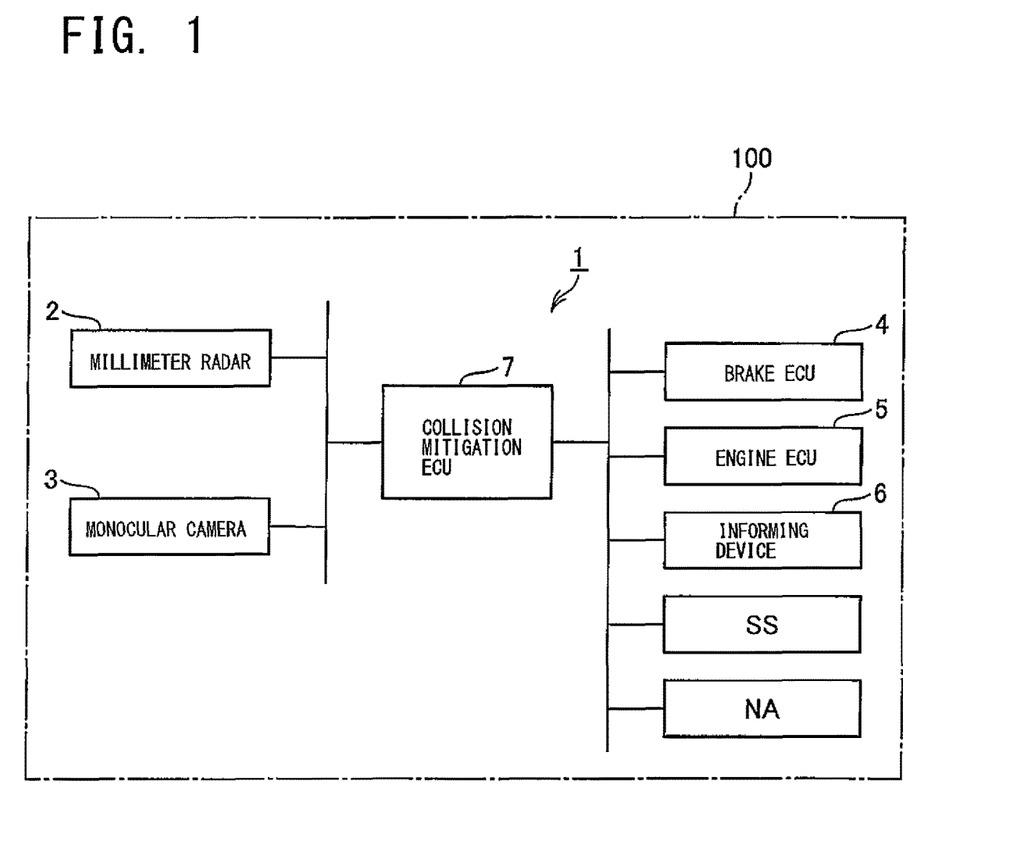
FIG. 1 is a block diagram illustrating a schematic structure of a collision mitigating system to which an exemplary embodiment of the present invention is applied.

Referring to FIG. 1, the collision mitigating apparatus 1 includes a millimeter radar 2 as an example of electromagnetic sensors, a monocular camera 3 as an example of imaging devices, a brake electronic control unit (ECU) 4, an engine ECU 5, an informing device 6, and a collision mitigation ECU 7.

In the collision mitigating apparatus 1, the collision mitigation ECU 7 is communicably connected to the millimeter radar 2, monocular camera 3, brake ECU 4, engine ECU 5, and informing device 6. Note that any configuration for establishing these communications can be freely determined.

The millimeter radar 2 is a radar device for detecting targets using millimeter waves. For example, the millimeter radar 2 is mounted to the center of the front grille, i.e. the front, of the own vehicle 10, that is, mounted to the head position of the own vehicle 10.

The millimeter radar 2 is configured to transmit millimeter waves to the front while scanning the millimeter waves in a horizontal plane. The millimeter radar 2 is configured to receive returned millimeter echoes based on reflection of the transmitted millimeter waves, thus obtaining received data. Then, the millimeter radar 2 is configured to transmit the received data to the collision mitigation ECU 7 as radar signals.

The millimeter radar 2 collects, in adjacent detection points, ones that are close to each other, and outputs the collected detection points as one target. At that time, a substantially center point in the collected detection points is defined as coordinates of the target. The millimeter radar 2 recognizes the size of a target based on the number of collected detection points for the target. For example, the millimeter radar 2 recognizes, as the size of a target, the vertical width and horizontal width of the collected detection points. Then, the millimeter radar 2 generates the radar signals including the position and size of each target.

The monocular camera 3 includes a single CCD camera, and is mounted to the front windshield or to the portion located adjacent to the front windshield, such as the center of the reverse side of, for example, the rearview mirror in the passenger compartment of the own vehicle 100. The monocular camera 3 captures images at least in front of the own vehicle 100 using the CCD camera, and transmits captured data, i.e. image data to the collision mitigation ECU 7 as image signals.

The brake ECU 4 is an electronic control unit for controlling the braking of the own vehicle 100, and includes, for example, a CPU, a ROM, and a RAM. Specifically, the brake ECU 4 controls a brake actuator, which opens or closes an intensifier control valve and a decompression valve provided to a brake hydraulic circuit, according to a value measured by a sensor that measures the amount of depression of a brake pedal; the actuator will be referred to as an ACT. This control adjusts the braking force applied to the own vehicle 100. The brake ECU 4 controls the brake actuator to increase the braking force applied to the own vehicle 100 according to instructions sent from the collision mitigation ECU 7.

The engine ECU 5 is an electronic control unit for controlling, for example, the start-up of an internal combustion engine, which will be referred to as an engine, the stop of the engine, power output from the engine, the quantity of fuel sprayed into each combustion chamber of the engine, and the ignition timing of fuel in each combustion chamber of the engine. The engine ECU 5 includes, for example, a CPU, a ROM, and a RAM. Specifically, the engine ECU 5 controls a throttle ACT, which opens or closes a throttle provided in an intake pipe, according to a value measured by a sensor that measures the amount of depression of an accelerator pedal. This control adjusts the drive power output from the engine, i.e. the drive power transferred to the driving wheels of the own vehicle 100 to travel the own vehicle 100. The engine ECU 5 controls the throttle ACT to reduce the drive power output from the engine according to instructions sent from the collision mitigation ECU 7.

The informing device 6 gives information to a driver of the own vehicle 100 when receiving an alarm signal sent from the collision mitigation ECU 7.

The collision mitigation ECU 7 is an electronic control unit for performing overall control of the collision mitigating apparatus 1, and includes, for example, a CPU, a ROM, and a RAM. The collision mitigation ECU 7 captures the radar signals from the millimeter radar 2 and the image signals from the monocular camera 3 every predetermined time based on a master clock of the CPU.

The collision mitigation ECU 7 identifies, in accordance one or more programs stored in the ROM and/or RAM, target information including, for example, the position, size, and relative speed of each target, using the radar signals and image signals. Then, the collision mitigation ECU 7 executes a routine for avoiding and/or mitigating a collision between a target corresponding to the identified target information and the own vehicle 100 if necessary arises. As the routine for avoiding and/or mitigating this collision, the collision mitigation ECU 7, for example, performs at least one of (1) A task that activates the brake ECU 4, engine ECU 5, and informing device 6 to avoid a collision (2) A task that activates the brake ECU 4, engine ECU 5, and informing device 6 to mitigate collision impacts to the own vehicle 100. Note that the descriptions of the routine for avoiding and/or mitigating a collision are omitted in the exemplary embodiment, because the routine for avoiding and/or mitigating a collision can be carried out based on well-known technologies.

Routine of the Exemplary Embodiment

The collision mitigation ECU 7 of the collision mitigating apparatus 1 performs a routine that detects axial misalignment of the millimeter radar 2, and corrects the radar signals obtained by the millimeter radar 2. Specifically, the collision mitigation ECU 7 is configured to detect targets based on the radar signals obtained by the millimeter radar 2 and the image signals obtained by the monocular camera 3, thus detecting, for each detected target, the target information including, for example, the position, size, and relative speed more accurately. For accurately detecting a target based on the radar signals obtained by the millimeter radar 2 and the image signals obtained by the monocular camera 3, it is necessary for the collision mitigation ECU 7 to accurately understand whether a target detected based on the radar signals obtained by the millimeter radar 2 is identical to a target detected based on the image signals obtained by the monocular camera 3.

From this viewpoint, axial misalignment of the optical axis of the monocular camera 3 relative to a previously designed reference optical axis is unlikely to occur, because the monocular camera 3 is disposed in the passenger compartment of the own vehicle 100.

In contrast, the millimeter radar 2 is often mounted to the outer side of the own vehicle 100, for example, to the center of the front of the own vehicle 100. For this reason, the center axis of the millimeter-wave beams output from the millimeter radar 2 may be easily misaligned with the previously designed reference axis of the millimeter-wave beams due to the influence of wind pressure and/or flying objects.

The collision mitigation ECU 7 of the exemplary embodiment detects the misalignment of the center axis of the millimeter radar 2 relative to the above defined reference axis in the own vehicle 100 as axial misalignment. Then, the collision mitigation ECU 7 corrects, based on the axial misalignment, the radar signals obtained by the millimeter radar 2. This correction enables the collision mitigation ECU 7 to precisely determine whether a target detected based on the radar signals obtained by the millimeter radar 2 is identical to a target detected based on the image signals obtained by the monocular camera 3.

The monocular camera 3 of the exemplary embodiment has a function of correcting axial misalignment of the optical axis thereof. The front direction, i.e. the direction of the reference axis, of the own vehicle 100 in a horizontal plane including the axial direction of the monocular camera 3, which corresponds to an X-Y plane described later, is therefore substantially aligned with the axial direction of the monocular camera 3.

The collision mitigation ECU 7 is therefore capable of diagnosing, in the horizontal plane, whether there is axial misalignment in the millimeter radar 2 relative to the direction of the optical axis of the monocular camera 3, i.e. relative to the position of the target obtained based on the images captured by the monocular camera 3. Upon diagnosing that there is axial misalignment, the collision mitigation ECU 7 calculates a quantity of the axial misalignment, and corrects, based on the calculated axial misalignment quantity, the radar signals obtained by the millimeter radar 2.

Figure 2:
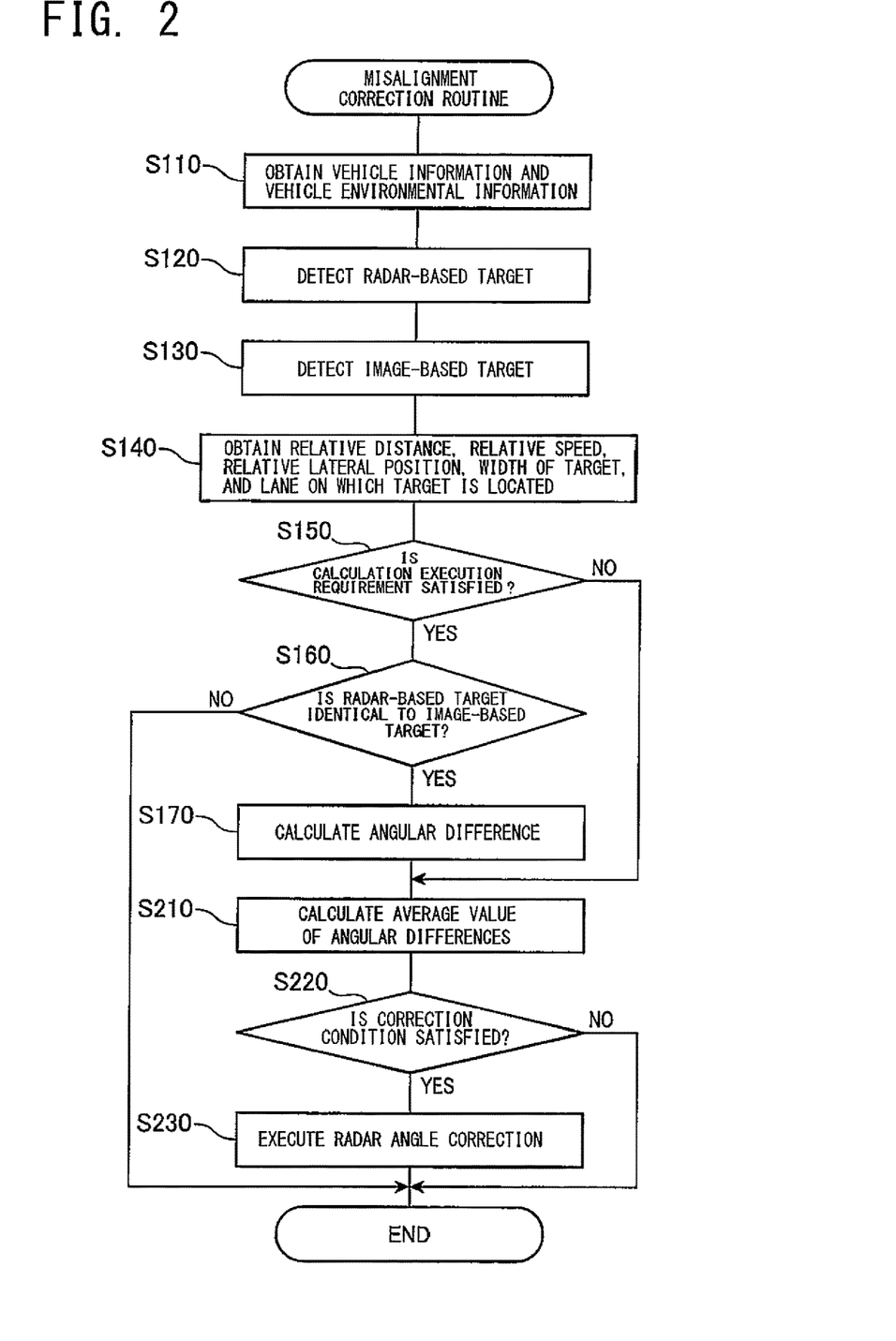
FIG. 2 is a flowchart illustrating a misalignment correction routine carried out by a collision mitigation ECU illustrated in FIG. 1.

Specifically, the collision mitigation ECU 7 performs a misalignment correction routine illustrated in FIG. 2. The misalignment correction routine is for example started when the own vehicle 100 is powered on, and thereafter, the misalignment correction routine is repeatedly performed for every predetermined period.

As illustrated in FIG. 2, upon starting the misalignment correction routine, the collision mitigation ECU 7 obtains vehicle information and vehicle environmental information in step S110. Specifically, in step S110, the collision mitigation ECU 7 for example obtains, as the vehicle information, a speed and a yaw rate of the own vehicle 100 from respective known vehicle speed sensor and yaw rate sensor included in sensors SS installed in the own vehicle 100. In step S110, the collision mitigation ECU 7 obtains, as the vehicle environmental information, the radius of curvature of a road on which the own vehicle 100 is travelling, using environmental information sent from a known navigation apparatus NA installed in the own vehicle 100. The navigation information includes information about roads around the current travelling position of the own vehicle 100.

Next, the collision mitigation ECU 7 detects a target based on the radar signals sent from the millimeter radar 2, i.e. detection information by the millimeter radar 2 in step S120.

Specifically, in step S120, the collision mitigation ECU 7 calculates, i.e. identifies, based on the radar signals, (1) The linear distance, i.e. the shortest distance, from the own vehicle 100 to a predetermined feature point of the detected target (2) A horizontal azimuth position of the first feature point of the detected target.

The horizontal azimuth position of the first feature point represents an angular position of the first feature point relative to the front direction of the own vehicle 100.

As illustrated in FIG. 3A, the collision mitigation ECU 7 calculates, i.e. identifies, based on the calculated linear distance and horizontal azimuth position, the positional coordinates, i.e. X and Y coordinates, of the feature point of the detected target in the X-Y plane as a detection point 22 of the target in the X-Y plane. Note that FIG. 3A illustrates a preceding vehicle 110 as the detected target.

The X-Y plane is defined to have the vehicle width direction, i.e. horizontal direction, of the own vehicle 100 as the X axis, and the longitudinal direction, i.e. the front direction, of the own vehicle 100 as the Y axis. In the X-Y plane, the front edge point, i.e. the center position of the front, of the own vehicle 100 is defined as a reference point Po through which the center axis of the millimeter radar 2 passes. The first feature point 22, i.e. detection point, of the detected target represents the position relative to the reference point Po, and is, for example, defined as the center point of the rear end of the detected target; the center point has the same height as the height of the reference point Po.

Note that FIG. 3A illustrates an example where the preceding vehicle 100, which is located in front of the own vehicle 100, is the detected target. In this example, the first feature point, i.e. the detection point, 22 of the detected target is a point of the rear end of the preceding vehicle 100, which has the same height as the height of the reference point Po. Hereinafter, the target detected in step S110, i.e. the target detected based on the detection information by the millimeter radar 2, will be referred to as a radar-based target. Note that the width, i.e. the X-directional width, of the radar-based target can be calculated based on the positional information of the feature point 22. That is, the collision mitigation ECU 7 identifies the coordinates (x1, y1) of the first feature point 22 of the radar-based target and the width of the radar-based target in the X-Y plane.

Subsequently, the collision mitigation ECU 7 detects a target based on the image signals sent from the monocular camera 3, i.e. the images captured by the monocular camera 3 in step S130.

Specifically, the collision mitigation ECU 7 performs a known matching task to match a captured image represented by the image signals with many target models previously stored in the ROM and/or the RAM in step S130. Each of the target models is one of feature patterns prepared for the respective types, i.e. vehicle, pedestrian, and the like, of targets; the feature patterns are stored in the ROM or RAM.

The collision mitigation ECU 7 analyzes the results of the matching to identify a target in the captured image accordingly.

The collision mitigation ECU 7 determines, based on the positions of the identified target in the captured image in the vertical direction, a Y coordinate of the identified target in the X-Y plane. In addition, the collision mitigation ECU 7 determines, based on the positions of both edges of the identified target in the captured image in the horizontal direction, a horizontal azimuth position of the identified target; the horizontal azimuth position of the identified target represents an angular position of the identified target relative to the front direction of the own vehicle 100, i.e. the reference axis. In other words, the collision mitigation ECU 7 determines, based on the width of the identified target in the captured image in the horizontal direction, a horizontal azimuth position of the identified target.

Specifically, the farther the position of a target in the front direction, i.e. the reference-axis direction, of the own vehicle 100 is, in other words, the larger the Y coordinate of the target is, the likely closer the position of the lower end of the identified target in the captured image is to the upper end of the captured image. In other words, the lower end of the identified target in the captured image serves as a parameter indicative of the Y coordinate of the target in the X-Y plane in the front direction, i.e. the reference-axis direction, of the own vehicle 100. The collision mitigation ECU 7 therefore determines the Y coordinate of the identified target based on the lower end position of the target in the captured image.

In addition, the front direction of the own vehicle 100, which represents in detail the reference axis that is a linear line with the X coordinate being zero, passes through a focus of expansion (FOE) of the monocular camera 3 in the captured image. This shows that, the larger the deviation, i.e. the inclination, of the horizontal direction, i.e. the right-left direction, of the identified target relative to the front direction of the own vehicle 100 is, the larger the horizontal direction (right-left direction) of the target relative to the reference axis passing through the FOE of the monocular camera 3 in the captured image is. In other words, the deviation of the horizontal direction, i.e. the right-left direction, of the identified target relative to the front direction of the own vehicle 100 in the captured image serves as a parameter indicative of the positional information, i.e. the horizontal azimuth position, of the target in the X-Y plane.

For this reason, as illustrated in FIG. 3B, the collision mitigation ECU 7 determines the horizontal azimuth position of the center position of the identified target, based on (1) An angle α of a line L1, which passes through the reference point Po of the own vehicle 100 and the center of the identified target, relative to the liner line with the X coordinate being zero serving as the reference axis (2) A distance D of a vertical line L2, which passes through the center of the identified target, relative to the reference axis.

Then, the collision mitigation ECU 7 identifies, based on the horizontal azimuth position of the center position of the identified target, the coordinates (x2, y2) of a center point, i.e. a second feature point, of the rear end of the identified target in the X-Y plane; the rear end of the identified target corresponds to the lower end of the identified target in the captured image, and the center point, i.e. the second feature point, of the rear end of the identified target has the same height as the height of the reference point Po.

Specifically, as illustrated in FIG. 3B, the collision mitigation ECU 7 identifies the Y coordinate and the horizontal azimuth position, i.e. angular position, of the second feature point of the identified target in the X-Y plane, in other words, the coordinates (x2, y2) of the second feature point of the identified target in the X-Y plane as a detection point of the target in the X-Y plane in step S130. Hereinafter, the target detected in step S130, i.e. the target detected based on the image captured by the millimeter radar 2, will be referred to as an image-based target.

Next, in step S140, the collision mitigation ECU 7 obtains (1) The relative distance, relative speed, and relative lateral position of the radar-based target 22, i.e. the first feature point, relative to the own vehicle 100, i.e. the reference point Po (2) The relative distance, relative speed, and relative lateral position of the image-based target 21, i.e. the second feature point, relative to the own vehicle 100, i.e. the reference point Po.

The relative lateral position of each of the first and second feature points represents the relative position of the corresponding one of the first and second feature points in the X direction.

In step S140, the collision mitigation ECU 7 also obtains the width of each of the radar-based target 22 and the image-based target 21, and a lane on which each of the radar-based target 22 and the image-based target 21 is located.

The relative distance, relative speed, relative lateral position, and width of each of the radar-based target 22 and the image-based target 21 can be obtained based on a corresponding one of the processing results in step S120 and the processing results in step S130.

In addition, for the lane on which each of the radar-based target 22 and the image-based target 21 is located, the collision mitigation ECU 7 is capable of performing a known lane-marker recognition task to, for example, recognize the lane markers in the captured image, thus recognizing the lane on which the own vehicle 100 is travelling. Then, the collision mitigation ECU 7 is capable of determining, based on the information about the recognized lane, each of the radar-based target 22 and the image-based target 21 is located on the recognized lane.

Next, the collision mitigation ECU 7 determines whether a calculation execution requirement is satisfied in step S150. The calculation execution requirement includes conditions for estimating axial misalignment of the radar with higher accuracy.

The calculation execution requirement includes the following first to sixth conditions:

The first condition is that the relative distance of each of the radar-based target 22 and the image-based target 21 relative to the own vehicle 100 is within a predetermined range, such as the range from 10 m inclusive to 50 m exclusive.

The second condition is that the relative speed of each of the radar-based target 22 and the image-based target 21 relative to the own vehicle 100 is less than a predetermined threshold speed. This condition aims to eliminate stationary objects and oncoming vehicles from the identified radar-based target 22 and image-based target 21.

The third condition is that the relative lateral position of each of the radar-based target 22 and the image-based target 21 relative to the own vehicle 100 is small. This condition represents the identified targets are located in the lane on which the own vehicle 100 is travelling.

The fourth condition is that the width of each of the radar-based target 22 and the image-based target 21 is short, such as a shorter length than 2 m.

The fifth condition is that the radius of curvature of the road on which the own vehicle 100 is travelling is equal to or more than a specified value.

The sixth condition is that the position of the image-based target 21 is located to be close to the center of the image-based target 21, such as located within a predetermined shaped and sized region including the center of the image-based target 21.

The collision mitigation ECU 7 can be configured to determine that the calculation execution requirement is satisfied upon determining that at least one of the first to sixth conditions is satisfied (YES in step S150).

Determining whether the first condition is satisfied enables a region in which the detection accuracy of each of the millimeter radar 2 and the monocular camera 3 is high to be used. This reduces calculation errors of the misalignment quantity of the millimeter radar 2 due to low detection accuracy of each of the millimeter radar 2 and the monocular camera 3. This enables the misalignment quantity of the millimeter radar 2 to be estimated with higher accuracy.

Determining whether the second condition is satisfied enables a radar-based target and an image-based target, each of which has higher reliability, to be used. This reduces calculation errors of the misalignment quantity of the millimeter radar 2 due to estimation of an inappropriate radar-based target 22 and an inappropriate image-based target 21. This enables the misalignment quantity of the millimeter radar 2 to be estimated with higher accuracy.

Determining whether the third condition is satisfied enables the millimeter radar 2 mounted to the front end of the own vehicle 100 to detect a preceding vehicle located in front of the own vehicle 100 as a radar-based target 22, and to use the detected radar-based target 22 as a target for calculation of the misalignment quantity of the millimeter radar 2.

This reduces calculation errors of the misalignment quantity of the millimeter radar 2 due to detection of one of both edges of a preceding vehicle. This enables the misalignment quantity of the millimeter radar 2 to be estimated with higher accuracy.

Determining whether the fourth condition is satisfied enables preceding vehicles, which have small variations in their relative horizontal distances thereamong and each have narrow width, to be used as the radar-based and image-based targets 22 and 21.

This reduces calculation errors of the misalignment quantity of the millimeter radar 2 due to variations in the relative lateral positions of the radar-based and image-based targets 22 and 21. This enables the misalignment quantity of the millimeter radar 2 to be estimated with higher accuracy.

Determining whether the fifth condition is satisfied enables the operations in steps S160 and S170 described later to be carried out while the own vehicle 100 is travelling on a substantially straight road.

This reduces calculation errors of the misalignment quantity of the millimeter radar 2 due to reduction in the accuracy of the relative horizontal position of each of the radar-based target 22 and the image-based target 21 while the own vehicle 100 is travelling on a curved road. This enables the misalignment quantity of the millimeter radar 2 to be estimated with higher accuracy.

Determining whether the sixth condition is satisfied enables a preceding vehicle detected in a region in which the detection accuracy of the monocular camera 3 serving as an image sensor to be used as the image-based target 21.

This reduces calculation errors of the misalignment quantity of the millimeter radar 2 due to reduction in the accuracy of the positional coordinates of the image-based target. This enables the misalignment quantity of the millimeter radar 2 to be estimated with higher accuracy.

Note that the collision mitigation ECU 7 can obtain the radius of curvature of a road on which the own vehicle 100 is travelling, using environmental information, which is obtained by the navigation apparatus NA and is sent therefrom; the environmental information includes road information around the currently travelling location of the own vehicle 100. The collision mitigation ECU 7 can calculate the radius of curvature of a road on which the own vehicle 100 is travelling, based on the yaw rate of the own vehicle 100, which is measured by the yaw rate sensor. The collision mitigation ECU 7 can estimate the radius of curvature of a road on which the own vehicle 100 is travelling, based on, for example, the shapes of roadside objects, such as guardrails on the road, included in an image captured by the monocular camera 3.

Upon determining that at least one condition, which is set as the calculation execution requirement, in the first to sixth conditions is not satisfied (NO in step S150), the misalignment correction routine proceeds to step S210 described later while skipping steps S160 and S170.

Otherwise, upon determining that at least one condition, which is set as the calculation execution requirement, in the first to sixth conditions is satisfied (YES in step S150), the collision mitigation ECU 7 determines whether the radar-based target 22 is identical to the image-based target 21 in step S160.

For example, the collision mitigation ECU 7 determines whether the following first to third determination criteria are satisfied in step S160:

The first determination criterion is whether the location of the radar-based target 22 and the location of the image-based target 21 are similar to each other, in other words, the positional coordinates (x1, y1) of the first feature point are similar to the positional coordinates (x2, y2) of the second feature point The second determination criterion is whether the size of the radar-based target 22 and the size of the image-based target 21 are similar to each other The third determination criterion is whether the relative speed of the radar-based target 22 relative to the own vehicle 100 and the relative speed of the image-based target 21 relative to the own vehicle 100 are similar to each other For example, in step S160, the collision mitigation ECU 7 determines that the location of the radar-based target 22 and the location of the image-based target 21 are similar to each other, in other words, the first determination criterion is satisfied, upon determining that the difference between each of the positional coordinates (x1, y1) of the first feature point and a corresponding one of the positional coordinates (x2, y2) of the second feature point is equal to or less than a predetermined threshold.

As another example, the collision mitigation ECU 7 determines that the size of the radar-based target 22 and the size of the image-based target 21 are similar to each other, in other words, the second determination criterion is satisfied, upon determining that the absolute difference between the size, i.e. the horizontal width, of the radar-based target 22 and the size, i.e. the horizontal width, of the image-based target 21 is equal to or less than a predetermined threshold.

As a further example, the collision mitigation ECU 7 determines that the relative speed of the radar-based target 22 relative to the own vehicle 100 and the relative speed of the image-based target 21 relative to the own vehicle 100 are similar to each other, in other words, the third determination criterion is satisfied, upon determining that the absolute difference between the relative speed of the radar-based target 22 relative to the own vehicle 100 and the relative speed of the image-based target 21 relative to the own vehicle 100 is equal to or less than a predetermined threshold.

For example, upon determining that all the first to third determination criteria are satisfied, the collision mitigation ECU 7 determines that the radar-based target 22 and the image-based target 21 are the same target (YES in step S160). Note that, if plural radar-based targets 22 and plural of image-based targets 21 are obtained, the collision mitigation ECU 7 determines, for each of the radar-based targets 22, whether there is at least one image-based target 22, which is determined to be identical to the corresponding radar-based target.

Otherwise, upon determining that at least one of the first to third determination criteria is unsatisfied (NO in step S160), the collision mitigation ECU 7 terminates the misalignment correction routine.

Following the operation in step S160, the collision mitigation ECU 7 calculates the angular difference between the radar-based target 22 (23) and the image-based target 21, which are determined to be the same target in step S160, in step S170. Note that the angular difference represents an angle formed by a line segment L11 connecting the reference point Po of the own vehicle 100 and the second feature point (x2, y2) of the image-based target 21 and a line segment L12 connecting the reference point Po of the own vehicle 100 and the first feature point (x1, y1) of the radar-based target 22.

As illustrated in FIG. 3A, if there is no misalignment in the millimeter radar 2, there is little angular difference between the radar-based target 22 and the image-based target 21. That is, the line segment L11 is substantially in agreement with the line segment L12.

On the other hand, if there is a misalignment in the millimeter radar 2, there is an angular difference θ between the line segment L11 connecting the reference point Po of the own vehicle 100 and the second feature point (x2, y2) of the image-based target 21 and the line segment L12 connecting the reference point Po of the own vehicle 100 and the first feature point (x1, y1) of the radar-based target 22.

Specifically, an example illustrated in FIG. 4 shows that a radar-based target 23 is located on the right side of the image-based target 21 by the angular difference θ. This means that there is a misalignment angle θ in the millimeter radar 2 in the left direction of the own vehicle 100. That is, the collision mitigation ECU 7 of the own vehicle 100 recognizes that direction of the center axis of millimeter beams of the millimeter radar 2, which is misaligned to the left side relative to the reference axis by the angle θ, is the front direction of the own vehicle 100. For this reason, the collision mitigation ECU 7 recognizes that a preceding vehicle 110 located in front of the own vehicle 100 is located on the right side by the misalignment angle θ. That is, the radar-based target 23 illustrated in FIG. 4 is located on the right side of the image-based target 21 by the misalignment angle θ.

In step S170, the collision mitigation ECU 7 calculates the angular difference θ between the radar-based target 22 (23) and the image-based target 21, i.e. the misalignment angle θ, and stores the angular difference θ in the memory, such as the RAM, of the ECU 7 or another memory communicable therewith, such as the memory of another ECU.

For example, upon determining that plural pairs of radar-based targets 22 and image-based targets 21 are each the same target, the collision mitigation ECU 7 calculates the angular difference θ between the radar-based target 22 and the image-based target 21 of each pair. This results in the plurality of angular differences θ being stored in the memory Because the misalignment correction routine is repeatedly executed, the angular differences θ, whose number corresponds to the number of execution of the misalignment correction routine, are stored in the memory.

On the other hand, when the determination in step S150 is NO, the collision mitigation ECU 7 skips the operations in steps S160 and S170, that is, prevents execution of the operations in steps S160 and S170, and carries out the operation in step S210.

After negative determination in step S150 or after completion of the operation in step S170, the collision mitigation ECU 7 calculates the average value of the angular differences θ stored in the memory in step S210.

Subsequently, in step S220, the collision mitigation ECU 7 determines whether a correction condition is satisfied based on the average value of the angular differences θ calculated in step S210.

The correction condition is a condition for correcting misalignment of the millimeter radar 2. For example, an example of the condition is that the probability that there is misalignment in the millimeter radar 2 is equal to or higher than a predetermined threshold value. Note that the probability that there is misalignment in the millimeter radar 2 is determined to increase as the number of angular differences θ used to calculate the average value of the angular differences θ increases.

Upon determining that the correction condition is satisfied, i.e. the number of angular differences θ used to calculate the average value of the angular differences θ is equal to or more than the threshold value (YES in step S220), the collision mitigation ECU 7 corrects the radar signals to cancel the average value of the angular differences θ in step S230. For example, in step S230, the collision mitigation ECU 7 determines correction values that correct the radar signals so as to cancel the average value of the angular differences θ on a coordinate system indicative of the radars transmitted and received by the millimeter radar 2. After completion of the operation in step S230, the collision mitigation ECU 7 terminates the misalignment correction routine.

Otherwise, upon determining that the correction condition is not satisfied (NO in step S220), the collision mitigation ECU 7 terminates the misalignment correction routine.

The collision mitigation ECU 7 of the collision mitigating apparatus 1 described above is configured to (1) Determine whether a first target detected by the millimeter radar 2 and a second target detected by the monocular camera 3 serving as an image sensor are the same target (2) Calculate, as a misalignment quantity, an angle formed between a first line segment connecting a predetermined reference point (position) of the collision mitigating apparatus 1, such as the reference point Po, and a first feature point of the first target and a second line segment connecting the predetermined reference point of the collision mitigating apparatus 1 and a second feature point of the second target.

The configuration of the misalignment calculation apparatus, which calculates the angle formed between the first line segment and the second line segment as the misalignment quantity, enables the axial misalignment quantity of the beam sensor, i.e. the misalignment quantity of the actual center axis of the probing beams of the beam sensor relative to the previously designed reference axis to be calculated with higher accuracy.

The collision mitigation ECU 7 of the collision mitigating apparatus 1 described above is configured to obtain environmental information around the collision mitigating apparatus 1, i.e. environmental information around the own vehicle 100.

For example, the collision mitigation ECU 7 obtains environmental information for calculating an axial misalignment quantity of the beam sensor; the environmental information includes (1) The physical relationships between the own vehicle 100 and each of a first object detected by the beam sensor, i.e. the millimeter radar 2 and a second object detected by the monocular camera 3 serving as an image sensor (2) Information about a road on which the own vehicle 100 is travelling.

Then, the collision mitigation ECU 7 determines whether the obtained environmental information satisfies at least one of recommended calculation conditions, such as the first to sixth conditions; the recommended calculation conditions are previously determined as environments suitable for calculating the misalignment quantity. The collision mitigation ECU 7 disables calculation of the misalignment quantity of the millimeter radar 2 as the beam sensor upon determining that the obtained environmental information satisfies no recommended calculation conditions.

This configuration of the collision mitigating apparatus 1, which calculates the axial misalignment of the millimeter radar 2 as the beam sensor only when the environmental information represents an environment suitable for calculating the misalignment quantity, improves the calculation accuracy of the misalignment quantity of the millimeter radar 2 as the beam sensor.

The collision mitigation ECU 7 of the collision mitigating apparatus 1 described above is configured to (1) Obtain, as part of the environmental information, the position of the second feature point of the second object on an image captured by the monocular camera 3 serving as an image sensor (2) Use one of the recommended calculation conditions that the position of the second feature point of the second object is within a predetermined region on the captured image; the predetermined region includes the center of the captured image.

This configuration of the collision mitigating apparatus 1 calculates the misalignment quantity of the millimeter radar 2 as the beam sensor when the location of the second feature point of the second object is within the predetermined region on the captured image; the predetermined region, which contains the center of the captured image, has lower distortion. This configuration therefore enables the misalignment quantity to be calculated with higher accuracy.

The collision mitigating apparatus 1 is installed in the own vehicle 100, and the collision mitigation ECU 7 obtains, as part of the environmental information, the location of a lane on which the own vehicle 100 is travelling. Then, the collision mitigation ECU 7 uses, as one of the recommended calculation conditions, the condition that the feature point of the second object is located within the travelling lane of the own vehicle 100.

The collision mitigating apparatus 1 installed in the own vehicle 100 calculates the misalignment quantity of the millimeter radar 2 as the beam sensor when the second feature point of the second object is located within the travelling lane of the own vehicle 100. Specifically, this enables the feature point of the second object to be located close to the center of the captured image during the calculation, thus reducing adverse effect of distortion. This therefore enables the misalignment quantity to be calculated with higher accuracy.

The collision mitigation ECU 7 of the collision mitigating apparatus 1 described above is configured to obtain, as part of the environmental information, the radius of curvature of a road on which the own vehicle 100 is travelling. Then, the collision mitigation ECU 7 uses, as one of the recommended calculation conditions, the condition that the radius of curvature of the road on which the own vehicle 100 is travelling is equal to or more than a predetermined value.

This configuration of the collision mitigating apparatus 1 calculates the misalignment quantity of the millimeter radar 2 as the beam sensor when the radius of curvature of the road on which the own vehicle 100 is travelling is so high that the road is likely to be a straight road. Specifically, this enables the feature point of the second object to be located close to the center of the captured image during the calculation, thus reducing adverse effect of distortion. This therefore enables the misalignment quantity to be calculated with higher accuracy.

The collision mitigation ECU 7 of the collision mitigating apparatus 1 described above is configured to (1) Obtain, as part of the environmental information, the width of the second object in the width direction, i.e. the horizontal direction, of the own vehicle 100

(2) Use, as one of the recommended calculation conditions, the condition that the width of the second object is less than a predetermined value.

If the width of the second object were excessively wide, the difference between the location of the second object and the location of the first object could be likely to increase.

That is, the collision mitigation ECU 7 calculates the misalignment quantity of the millimeter radar 2 as the beam sensor when the width of the second object is shorter than a predetermine value. This therefore prevents the calculation accuracy of the misalignment quantity from deteriorating due to the wider width of the second object.

The collision mitigation ECU 7 of the collision mitigating apparatus 1 described above is configured to obtain, as part of the environmental information, the relative speed of the first object or second object relative to the own vehicle 100. Then, the collision mitigation ECU 7 uses, as one of the recommended calculation conditions, the condition that the relative speed of the first object or second object relative to the own vehicle 100 is less than a predetermined value.

That is, the collision mitigation ECU 7 calculates the misalignment quantity of the millimeter radar 2 as the beam sensor when the relative speed of the first object or second object relative to the own vehicle 100 is comparatively low. This enables the misalignment quantity of the millimeter radar 2 to be calculated with smaller change in the environment. This therefore improves the calculation accuracy of the misalignment quantity.

The collision mitigation ECU 7 of the collision mitigating apparatus 1 described above is configured to (1) Obtain, as part of the environmental information, the relative lateral position of the first object or the second object relative to the own vehicle 100

(2) Use, as one of the recommended calculation conditions, the condition that the relative lateral position of the first object or the second object relative to the own vehicle 100 is less than a predetermined value.

That is, the collision mitigation ECU 7 calculates the misalignment quantity of the millimeter radar 2 as the beam sensor when the relative horizontal position of the first object or the second object is located to be close to the front of the own vehicle 100. This enables the misalignment quantity of the millimeter radar 2 to be calculated with higher accuracy upon the beam sensor and the image sensor being mounted to the own vehicle 100 while these sensors are directed in front of the own vehicle 100.

The collision mitigation ECU 7 of the collision mitigating apparatus 1 described above is configured to obtain the relative distance of the second object relative to the own vehicle 100 on the captured image (2) Use, as one of the recommended calculation conditions, the condition that the relative distance is within a predetermined distance range.

That is, the collision mitigation ECU 7 calculates the misalignment quantity of the millimeter radar 2 as the beam sensor when the relative distance of the second object relative to the own vehicle 100 is within the predetermined distance range, and the second object has a proper size on the captured image. This enables the misalignment quantity of the millimeter radar 2 to be calculated with higher accuracy.

The collision mitigation ECU 7 of the collision mitigating apparatus 1 described above repeatedly performs determination of whether the first object is identical to the second object in time sequence. Then, the collision mitigation ECU 7 repeatedly calculates, as the misalignment quantity, the angle formed by the first object and the second object each time it is determined that the first object is identical to the second object. Then, the collision mitigation ECU 7 obtains the final misalignment quantity of the millimeter radar 2 as the beam sensor as a function of the calculated result of the plurality of misalignment quantities.

This configuration of the collision mitigating apparatus 1 obtains the final misalignment quantity of the millimeter radar 2 as the beam sensor, based on the calculated result of the plurality of misalignment quantities. For this reason, even if an erroneous misalignment quantity is temporarily detected, this configuration reduces the adverse effect of the erroneous misalignment quantity on the final misalignment quantity of the millimeter radar 2 as the beam sensor. This therefore enables the final misalignment quantity of the millimeter radar 2 as the beam sensor with higher accuracy.

Modification

The present invention is not limited to the above present embodiment. Reference numerals used in the above present embodiment are also used in the claims, but the reference numerals are used in order to easily understand the invention of each claim, and therefore we have no intention of the reference numerals limiting the scope of the invention of each claim.

The functions of one element in each embodiment can be distributed as plural elements, and the functions that plural elements have can be combined into one element. At least part of the structure of each embodiment can be replaced with a known structure having the same function as the at least part of the structure of the corresponding embodiment. A part of the structure of each embodiment can be eliminated as long as the remaining structure of the corresponding embodiment is capable of solving the problem. At least part of the structure of each embodiment can be added to or replaced with the structures of the other embodiments. All aspects included in the technological ideas specified by the language employed by the claims constitute embodiments of the present invention.

The present invention can be implemented by various embodiments in addition to the collision mitigation apparatus 1; the various embodiments include programs for serving a computer as the collision mitigation apparatus 1, storage media storing the programs, and collision mitigation methods.

Example of Correspondence Relationship Between Elements of Exemplary Embodiment and Elements of One Aspect of Present Invention The collision mitigating apparatus 1 according to the exemplary embodiment corresponds to, for example, an axial misalignment calculating apparatus. In the exemplary embodiment, each of the operations in steps S110 to S230 carried out by the collision mitigation ECU 7 constitutes a functional element, and the operations in steps S110 to S230 can be expressed as functional blocks (steps S110 to S230) that the collision mitigating apparatus 1 has.

In particular, the operation or operation block in step S110 executed by the collision mitigation ECU 7 corresponds to, for example, an environmental information obtaining means or unit of one aspect of the present invention. The operation or operation block in step S150 executed by the collision mitigation ECU 7 corresponds to, for example, an environment determining means or unit of one aspect of the present invention.

In addition, the operation that the collision mitigation ECU 7 skips the operations in steps S160 and S170 upon the determination of step S150 being NO corresponds to, for example, a preventing means or unit of one aspect of the present invention.

The operation or operation block in step S160 executed by the collision mitigation ECU 7 corresponds to, for example, an identity determining means or unit of one aspect of the present invention. The operation or operation block in step S170 executed by the collision mitigation ECU 7 corresponds to, for example, a misalignment quantity calculating means or unit of one aspect of the present invention. The operation or operation block in step S210 executed by the collision mitigation ECU 7 corresponds to, for example, a plural misalignment-quantity calculating means or unit of one aspect of the present invention.

| Reference Sins List | | | |
|---|---|---|---|
| 1 | Collision mitigation apparatus | 2 | Millimeter radar |
| 3 | Monocular camera | 4 | Brake ECU |
| 5 | Engine ECU | 6 | Informing device |
| 7 | Collision mitigation ECU | 21 | Image-based target |
| 22 | Detection point | 22 | Radar-based target |
| 23 | Radar-based target | 100 | Own vehicle |
| 110 | Preceding vehicle | | |

The invention claimed is:

1. A misalignment quantity calculating apparatus for calculating and correcting a misalignment quantity of an electromagnetic wave sensor relative to a vehicle upon which the electromagnetic wave sensor is mounted, the misalignment quantity calculating apparatus comprising:

an identity determining means for determining whether a first object detected by the electromagnetic wave sensor is identical to a second object detected by an image sensor, the electromagnetic wave sensor transmitting a probing beam and receiving an echo based on the probing beam to detect the first object, the image sensor capturing an image and processing the image to detect the second object;

a misalignment quantity calculating means for calculating, as a misalignment quantity of the electromagnetic wave sensor, an angle between a first line segment and a second line segment when it is determined that the first object is identical to the second object, the first line segment connecting a predetermined reference point of the misalignment quantity calculating apparatus and a first feature point of the first object, the second line segment connecting the predetermined reference point and a second feature point of the second object, wherein the predetermined reference point comprises a front edge point of the vehicle;

a determining means for determining whether the calculated angle between the first line segment and the second line segment is equal to or more than an angular detection threshold value; and a correcting means for correcting the probe beam of the electromagnetic wave sensor to cancel the calculated angle between the first line segment and the second line segment.

2. The misalignment quantity calculating apparatus according to claim 1, further comprising:

an environmental information obtaining means for obtaining environmental information indicative of an environment around the misalignment quantity calculating apparatus in calculation of the misalignment quantity;

an environment determining means for determining whether the environmental information satisfies a recommended calculation condition, the recommended calculation condition being previously determined as an environment suitable for calculation of the misalignment quantity; and a preventing means for preventing the misalignment quantity calculating means from calculating the misalignment quantity when it is determined that the environmental information does not satisfy the recommended calculation condition.

3. The misalignment quantity calculating apparatus according to claim 1, wherein:

the environmental information obtaining means is configured to obtain, as the environmental information, a position of the second feature point of the second object on the captured image; and the environment determining means uses, as the recommended calculation condition, a condition that the position of the second feature point of the second object is located within a predetermined region on the captured image, the predetermined region including the center of the captured image.

4. The misalignment quantity calculating apparatus according to claim 3, wherein:

the misalignment quantity calculating apparatus is installed in a vehicle;

the environmental information obtaining means is configured to obtain, as the environmental information, a travelling lane on which the vehicle is travelling; and the environment determining means uses, as the recommended calculation condition, a condition that the second feature point of the second object is located within the travelling lane of the vehicle.

5. The misalignment quantity calculating apparatus according to claim 2, wherein:

the misalignment quantity calculating apparatus is installed in a vehicle;

the environmental information obtaining means is configured to obtain, as the environmental information, a radius of curvature of a road on which the vehicle is travelling; and the environment determining means uses, as the recommended calculation condition, a condition that the radius of curvature of the road on which the vehicle is travelling is equal to or more than a predetermined value.

6. The misalignment quantity calculating apparatus according to claim 2, wherein:

the environmental information obtaining means is configured to obtain, as the environmental information, a width of the second object in a horizontal direction; and the environment determining means uses, as the recommended calculation condition, a condition that the width of the second object is less than a predetermined value.

7. The misalignment quantity calculating apparatus according to claim 2, wherein:

the misalignment quantity calculating apparatus is installed in a vehicle;

the environmental information obtaining means is configured to obtain, as the environmental information, a relative speed of one of the first object and the second object relative to the vehicle; and the environment determining means uses, as the recommended calculation condition, a condition that the relative speed of one of the first object and the second object relative to the vehicle is less than a predetermined value.

8. The misalignment quantity calculating apparatus according to claim 2, wherein:

the misalignment quantity calculating apparatus is installed in a vehicle;

the environmental information obtaining means is configured to obtain, as the environmental information, a relative lateral position of one of the first feature point of the first object and the second feature point of the second object relative to the vehicle in a width direction of the vehicle; and the environment determining means uses, as the recommended calculation condition, a condition that the relative lateral position is less than a predetermined value.

9. The misalignment quantity calculating apparatus according to claim 2, wherein:

the misalignment quantity calculating apparatus is installed in a vehicle;

the environmental information obtaining means is configured to obtain a relative distance of the second feature point of the second object relative to the vehicle on the captured image; and the environment determining means uses, as the recommended calculation condition, a condition that the relative distance of the second feature point of the second object relative to the vehicle on the captured image is located within a predetermined distance range.

10. The misalignment quantity calculating apparatus according to claim 1, wherein:

the identity determining means repeatedly performs determination of whether the first object is identical to the second object in time sequence; and the misalignment quantity calculating means is configured to perform calculation of the misalignment quantity each time it is determined that the first object to obtain a calculated result of the misalignment quantities, the misalignment quantity calculating apparatus further comprising:

a plural misalignment quantity calculating means for calculating a final misalignment quantity of the beam sensor as a function of the calculated result of the misalignment quantities.

11. A system for correcting a misalignment of a sensor relative to a vehicle upon which the sensor is mounted, the system comprising:

an object detection sensor;
an electromagnetic wave sensor configured to transmit a probing beam and receiving an echo based on the probing beam; and
a microprocessor configured to:
- detect objects in the environment of the vehicle using the electromagnetic wave sensor and the object detection sensor;
- determine whether a first object detected by the electromagnetic wave sensor is identical to a second object detected by the object detection sensor;
- calculate, as a misalignment quantity of the electromagnetic wave sensor, an angle between a first line segment and a second line segment when it is determined that the first object is identical to the second object, the first line segment connecting a predetermined reference point of the misalignment quantity calculating apparatus and a first feature point of the first object, the second line segment connecting the predetermined reference point and a second feature point of the second object, wherein the predetermined reference point comprises a front edge point of the vehicle;
- determining whether the calculated angle between the first line segment and the second line segment is equal to or more than an angular detection threshold value; and
- correcting the probe beam of the electromagnetic wave sensor to cancel the calculated angle between the first line segment and the second line segment.

* * * * *